United States Patent Office 3,794,582
Patented Feb. 26, 1974

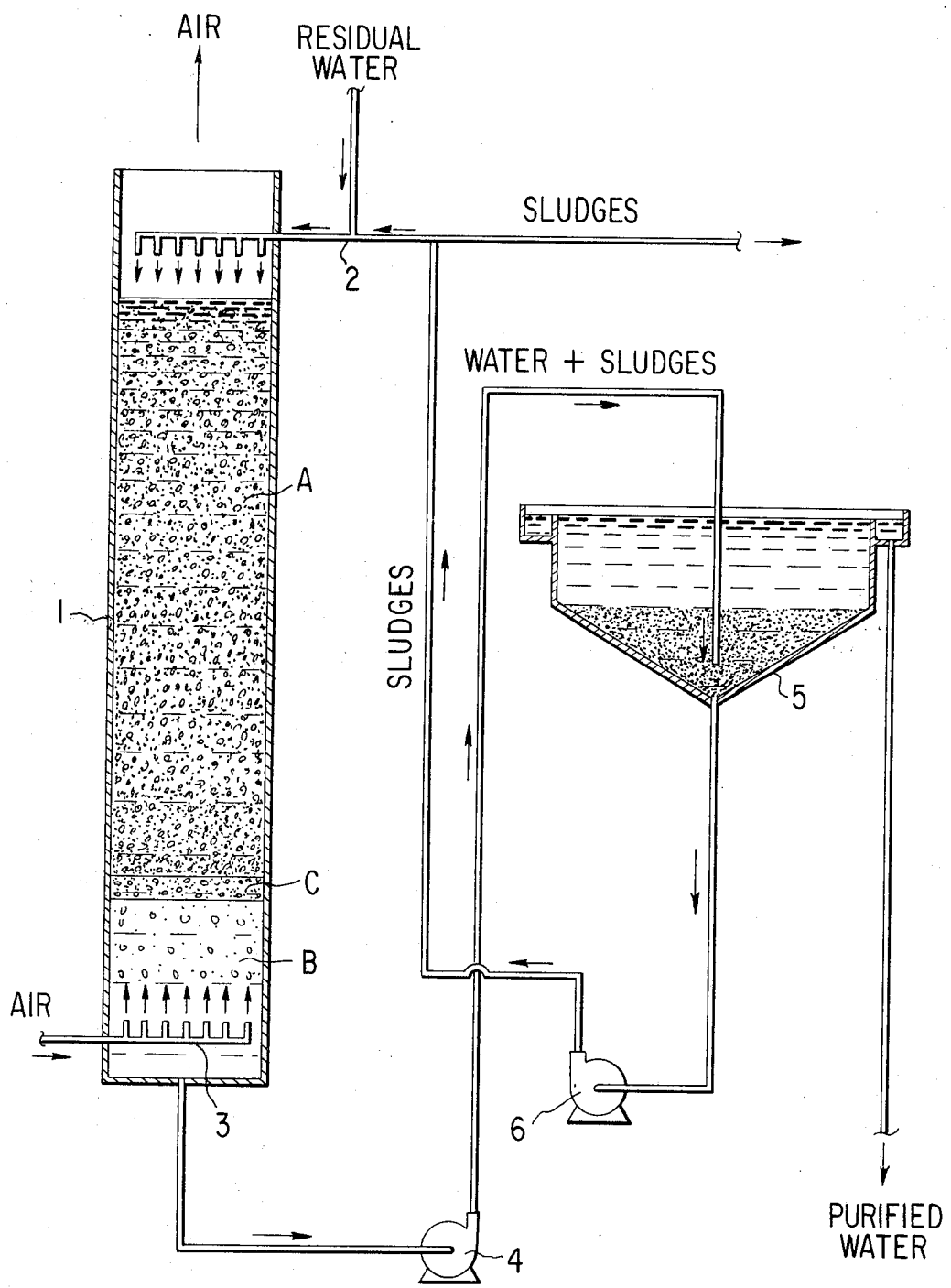

3,794,582
PROCESS FOR AERATING BIOLOGICAL SUSPENSIONS
Claude Lackme, Grenoble, Albert Digonnet, Montfleury, Louis Colas, Lyon, Jean Boutin, Mions, Jean-Pierre Dal Pont, Pont-de-Claix, and Bernard Papillon, La Mulatiere, France, assignors to Rhone-Progil, Paris, France
Filed Apr. 10, 1972, Ser. No. 242,394
Claims priority, application France, Apr. 9, 1971, 7113839
Int. Cl. C02c 1/04
U.S. Cl. 210—11
17 Claims

ABSTRACT OF THE DISCLOSURE

A process for introducing a gas into a suspension of microorganisms wherein a dense bed of introduced gas and liquid microorganism suspension is created in the upper zone of a treatment receptacle by counter-currently introducing a uniform dispersion of a gas at a constant rate into the base of a treatment receptacle having dispersed therein a liquid suspension containing microorganisms, which suspension is introduced at the top of said receptacle and the upper zone dense bed is separated from a less dense lower zone by an intermediate interface zone. The uppermost layer contains a greater quantity of gas than the lower layer and by continuously regulating the rate of suspension withdrawal from the receptacle there is maintained a stable densely packed bed of gas and microorganism suspension. Homogeneous distribution of gas and the presence of a gas-rich environment resulting from the upper zone dense bed of gas and microorganisms significantly improves the efficiency of gas utilization in biological aerating systems.

BACKGROUND OF THE INVENTION

The present invention relates to a process for insufflating a gas into a liquid suspension containing microorganisms as utilized in aerobic sewage treatment systems, water purification, bio-synthetic methods, and the like.

Microorganism suspensions employed in these processes are generally comprised of a liquid phase, such as, water, aqueous nutritive containing media, etc., containing a variety of living biological organisms, for example, bacteria, yeasts, lower fungi, algae, etc. In treatment facilities wherein microorganisms are intentionally added to materials entering such facilities, as in the case of aerobic bacterial sewage digestion and biological synthetic methods, or where it is necessary to destroy organisms already present in water, gases are introduced into these microorganism containing environments to either accomplish the degradation of same as in water ozonization or chlorination, or contrariwise, to provide life supporting gases which enhance the development of these organisms thereby allowing them to metabolize organic and/or mineral products.

Heretofore, gasification of these biological suspensions has been accomplished by means of plungers, manifolds, and more recently large turbines which introduce the gas into the liquid medium in the form of non-uniform bubbles. With these prior art devices, the quantity of gas actually consumed by the microorganisms present in the system is significantly lower than the quantity of gas introduced, thereby resulting in serious inefficiency of gas utilization. The inefficiency of these hitherto known devices is primarily attributable to the excessive rate of ascension of introduced gas in relation to the capacity of the biological medium to consume same. Thus, in conventional aerobic fermentation processes, the amount of oxygen actually consumed is only about 15% of the amount initially injected.

Therefore, there exists a need for a process wherein the introduced gas is homogeneously dispersed throughout the microorganism suspension in a manner whereby the rate of microorganism gas consumption closely parallels the rate of gas interfusion thereby effectuating improved gas utilization.

SUMMARY OF THE INVENTION

It is therefore a primary object of this invention to provide a process of introducing a gas into a suspension of microorganisms in which the rate of biological uptake of gas closely corresponds to the rate of gas injection.

Another object of this invention is to significantly improve gas utilization in systems containing microorganism suspensions such as bacterial sewage disposal, water purification plants, bio-synthetic processes, etc., by creating a dense bed of gas and liquid microorganism suspension in the upper zone of a suitable treatment receptacle.

Still another object of this invention is to provide an environment rich in gas in a bio-synthetic or degradative process, which environment enhances the rate of gas consumption by microorganisms contained therein and promotes the biological metabolism of organic and/or mineral substances also present in said environment, thereby significantly reducing the required contact time between microorganisms and the substances to be transformed.

Other objects, features, and advantages of the invention will be apparent to those skilled in the art from the detailed description of the invention which follows, and from the drawing.

BRIEF DESCRIPTION OF THE DRAWING

In the drawing:
The figure of drawing is a schematic diagram representing a preferred embodiment of an apparatus for carrying out the process of the present invention.

DETAILED DESCRIPTION OF THE INVENTION

In accordance with this invention, it has now been found that the rate of gas consumption will closely parallel the rate of gas introduction in a microorganism aerating process if a dense bed of gas and liquid microorganism suspension is created in the upper zone of a treatment receptacle. The upper zone of densely packed microorganisms and gas of this invention is created by counter-currently contacting a gas introduced at the base of a receptacle with a liquid suspension of microorganisms introduced at the top of said receptacle and establishing two superimposed layers separated by an interface layer in which the upper layer contains a greater quantity of gas than the lower layer.

The gasification process according to this invention may be employed to introduce a gas into biological suspension to either accomplish the destruction of microorganisms or to supply a life supporting gas which favors the development of such microorganisms. Thus, for instance, in municipal water purification processes it is desirable to inject a biocidal gas such as, ozone, chlorine, etc., into waters contaminated by potentially pathogenic organisms such as bacteria, viruses, fungi, and the like. However, in other treatment processes, it is necessary to provide an environment which favors the continued existence and even multiplication of microorganisms as in the case of aerobic waste digestion, biosynthetic processes, and the like, wherein the microorganisms are employed to synthesize or degrade certain organic and/or mineral substances and therefore the gas introduced in these processes may be air, oxygen, carbon dioxide, nitrogen, etc., and generally any gas which is required for bacterial development and metabolic processes. The microorganisms utilized in these processes may be, alone or in combination, bacteria, yeast, lower fungi, algae, protozoa, and other similar living organisms. Moreover, such biological suspensions have dissolved or dispersed therein, nutritive elements which are indispensable to microorganism existence as well as the materials sought to be transformed in such bio-synthetic or degradative processes. Thus, in the case of bio-synthetic processes the materials present in addition to life supporting gases and nutritive elements will be precursors of products sought to be metabolically synthesized by the microorganisms and examples of these products include, solvents, aliphatic carboxylic acids, amino acids, antibiotic agents, enzymes, vitamins, and the like. In degradative processes, such as residual water purification, the organic and/or mineral materials present in the water entering the treatment facility provide the nutritive elements necessary to microorganism life and by properly controlling the types of microorganisms present in the biological medium, such as, $CO_2$, nitrogen, and phosphorus fixing bacteria these contaminating materials will be transformed into separable products which can be removed by conventional filtering and clarifying processes.

When utilizing the aerating process of the instant invention in connection with certain synthetic or degradative applications it is desirable to insure sufficient contact time between microorganisms and materials to be transformed. The foregoing may be accomplished, for example, by returning withdrawn suspension to the receptacle at a predetermined rate in which case the liquid suspension being introduced into the treatment facility will be comprised of an admixture of the recycled phase containing incompletely transformed materials and a fresh solution containing untreated materials.

In attaining the plural phase distribution system of this invention comprised of an upper dense bed of gas and liquid microorganism suspension and a lower less dense bed, and further having an interface interposed between same, it may be desirable to introduce a surface-active agent to modify the interfacial conditions between the phases to reduce gas bubble coalescence in the suspension. Any conventional surface-active agent which is non-biostatic or biocidal in the quantities utilized and which is compatible with the metabolic reactions of the microorganisms present in the system may be used and include, for example, metal sulfonate alkyl benzenes, condensates or alkylene oxide and fatty acids, etc.

In practicing the present invention, the receptacle in which the gas/suspension contact process is effectuated is preferably a vertical column having a diameter less than its height and which is provided with suitable gas injection means at its base which are capable of supplying a uniform dispersion of bubbles of optimum size to achieve homogeneous distribution of gas within the suspension. Perforated plates, manifolds, or analogous devices may be used to supply gas to the system. Additionally, the treatment receptacle is equipped at the top with any suitable device, such as, manifolds, overflow pipes, etc., for introducing the liquid suspension.

The rate at which the gas travels upward through the suspension (expressed as volumetric gas flow/receptacle cross-sectional area/second) is generally in the range between about 0.2 to 100 mm. per second depending upon the stability of the dense bed zone, quantity of gas required for effective micro-biological metabolism and to sustain the organisms of the biological suspensions.

The rate at which the suspension passes through the receptacle (expressed as rate of gas flow hereinabove) will of course vary likewise with the stability of the dense bed zone and gas consumption rate in the contemplated biological medium. Moreover, the suspension flow rate varies with time inasmuch as according to the invention, the suspension withdrawal rate is at first greater than its rate of feed and then identical with the rate of feed as the plural phase system is established. Applicants' tests have indicated that suspension flow speeds generally range between about 0 to 200 mm. per second. During the stage of operation in which the suspension is taken off at a rate faster than the feeding rate, the ratio of drawing off/feeding rate depends upon the time necessary to establish a stable dense bed zone as well as the size of the treatment receptacle. It has been observed, however, that in most instances the aforesaid ratio ranges between about 1.05/1 and 1.5/1.

It has also been shown that once the plural phase system is established, in the lower layer gas occupies about 40% of the layer volume, i.e., the retention rate in said layer is less than 40%, while in the upper layer the retention rate exceeds 50%.

As a consequence of temporary displacement of the interface zone separating the two phases during process operation, it may be necessary to act upon the interface position to maintain same within a desired predetermined zone in the receptacle. To accomplish the aforesaid interface repositioning, the rate at which the suspension is removed from the receptacle is either increased or decreased depending upon the relative location of the interface at any given moment. Determination of the interface position may be made by any known optical or manometric method. An especially simple and efficient method consists of measuring the hydrostatic pressure in the receptacle at some point between the interface zone and the gas feeding zone and comparing this value with the reference pressure obtained at the desired interface position and using the resultant pressure differential to directly act upon a valve, such as a collapsible type valve, to open or close same. Alternatively, the valve may be acted upon indirectly by converting the pressure differential into, for example, an electrical signal by means of a suitable sensing device which signal will then cause an electrically operated valve to open or close thereby returning the interface zone to the desired position.

It is possible to advantageously utilize other known processes in the field of biology in conjunction with the present aerating process, such as for example, the application of radiation to the biological medium to accomplish photosynthesis by algae containing suspensions.

Moreover, as will be readily apparent to those skilled in the art, subsequent to the gasification process of this invention the suspension may be subjected wholly or partly to conventional after treatments, such as, microorganism separation, recovery of product materials or purified water, and various other analogous treatments.

A preferred application of the process according to the present invention is in the purification of residual water by means of sludges containing microorganisms. The hitherto known processes relating to such purification techniques are described in detail in Chapter 20 of M.M.P. Simon and R. Meunier's book entitled Microbiologie Industrielle et Genie Biochimique. In contradistinction to these former methods, the present process is characterized by the creation of an upper zone dense bed of suspension comprised of residual water, sludges admixed with purifying microorganisms, and air or oxygen. While dense beds obtained from two liquid phases have been described, the present gas/liquid dense bed is wholly unexpected inasmuch as it had been previously considered impossible due to the presence of a gas as well as the presence of solid particles in the liquid phase.

According to the instant preferred embodiment, following an oxygenation phase, sludges are separated from purified water by any conventional process such as, decantation in a drawing off circuit and the sludges obtained are recycled, wholly or partly, to the oxygenation receptacle. Additionally, purified water obtained may be submitted to a biocidal gas as described hereinabove.

With reference to the figure of drawing, which depicts the foregoing water purification process, an upper dense bed zone of gas and liquid suspension (A), a lower relatively loosely packed zone of same (B) and an interface (C) are created in a treatment receptacle 1 by introducing residual water and sludge containing purifying microorganisms via line 2 into the top of receptacle 1 while counter-currently introducing air via injectors 3 at the base of same. A pump 4 controls suspension drawing off rate and sends withdrawn suspension to decanter 5 where purified water is separated from sludge, which sludge is returned via pump 6 to receptacle 1 or to solids disposal (not shown).

Alternatively, the oxygenation may be accomplished in a series of separate parallel columns. Moreover, a large treatment tank divided into numerous vertical compartments may be utilized in practicing the above oxygenation process to efficiently and economically solve the water purification problems confronting especially the inhabitants of densely populated areas.

In order to further illustrate the present invention and the advantages thereof, the following specific examples are given, it being understood that the same are intended only as illustrative and in no wise limitative.

Example 1

Citric acid was biologically synthesized by creating an upper zone dense bed having a height of 1.25 m. in a vertical column 74 mm. in diameter and 2 m. in height, which bed was prepared from an aqueous suspension comprised of about 15% by weight of corn sugar reduced in iron content, and having added thereto aspergillus niger stumps. Suspension phosphate content was less than 0.01% and pH was held constant by calcium carbonate addition and temperature was maintained between 25° C. and 31° C.

Previously sterilized air was introduced into the above suspension at the rate of 40 l./hour while continuously feeding fresh suspension at the rate of 50 ml./hour and recycled suspension at the rate of 150 l./hour into the top of the column. Suspension containing product citric acid was withdrawn from the column at the rate of 50 ml./hour. This product containing fraction was passed to a rotating drum type filter wherein the microorganisms were separated and the filtrate was treated with lime to precipitate calcium citrate which after separation and washing was further reacted with sulfuric acid to regenerate citric acid. Product citric acid was obtained at the rate of 0.5 g./hour. The suspension liquor from filtration was recycled to the treatment column.

The following examples further illustrate the application of the invention process to residual water purification. The extent of water pollution was determined by measuring the chemical oxygen demand (COD) which is used to indicate the quantity of total oxidizable pollutants present in the water and which was determined by the potassium dichromate method in acid medium in the presence of a catalyst (silver sulfate) and a complexing agent (mercury sulfate). The residual water utilized in the examples hereinafter was a synthetic water containing glucose, gelatin, the fermentable products to be degraded, diammonium phosphate, diammonium sulfate, and nutritive elements required for microorganism metabolism. The biological oxygen demand (BOD), which is a measure of the quantity of biodegradable (aerobic) pollutants, was slightly less than the COD of the residual water.

The development of sludge bacterial population was measured by determining the quantity of dry materials, the ash content of said materials, and the Mohlmann index. The quantity of dry materials, expressed in g./l., represents bacterial population concentration in the receptacle and is determined after sludge filtration and drying at 105° C. Ash content of dry materials in percent is a measure of the degree of sludge mineralization and is determined after calcination at 500° C. The Mohlmann index, which characterizes the physical state of the sludge, is the sludge volume in milliliters for 1 gram of solids in suspension determined after 30 minutes of decantation.

Example 2

In a glass column 74 mm. in diameter and 2 m. high filled with activated sludge obtained from a conventional purification unit, a dense bed zone was created in the upper portion of the column and having a height of between about 1.15 to 1.25 m. by introducing air at the rate of 19 l./hour and liquid at rate of 185 l./hour of recycled sludge suspension and 6 l./hour of residual water to be treated, which water had a COD equal to 600 mg. $O_2$/l. 10 mg./l. of sodium sulfonate dodecylbenzene had been previously added to the residual water. The liquid phase was withdrawn from the column at the rate of 6 l./hour and passed to adecanter where it was determined to have a COD equal to between 50 and 65 mg. $O_2$/l. which represented a 90% purification. Average contact time between residual water and sludge was 2 hours. Dry material content ranged between 1.9 and 2.2 g./l., ash content was between 8 and 9.5%, and Mohlmann index was about 100. About 1.75 kg. of oxygen was required to remove 1 kg. of COD in the dense bed zone, while 12 to 18 kg. of oxygen were required to remove 1 kg. of COD in the less dense lower zone, which is 7 to 10 times more oxygen to accomplish the same result.

Example 3

Under the conditions of Example 2, water having a COD of 1000 mg. $O_2$/l. was purified without adding any surface active agent:

Content in dry materials ____ 2.4 g./l.
Ash content _____ 9.5%.
Mohlmann index _____ 80–90.
Purified water COD _____ 80–100 mg. $O_2$/l., (90% purification).
Quantity of oxygen used ____ 1.05 kg./kg. of removed COD.

Example 4

Under the conditions of Example 2, a residual water having a COD of 1200 mg. $O_2$/l. was purified:

Content in dry materials ____ 2.4–2.7 g.l.
Ash rate _____ 9–9.5%.
Mohlmann index _____ 75–85.
Purified water COD _____ 400–500 mg. $O_2$/l. (55–65% purified).
Quantity of oxygen used ____ 1.2–1.45 kg./kg. of removed COD.

Example 5

In a glass column 74 mm. in diameter and 2 m. high filled with activated sludge obtained from a conventional purification unit, a dense bed zone was created having a height of 1.15 to 1.25 m. using an air introduction rate of 19 l./h. and a liquid feed rate of 185 l./h. of recycled sludge suspension and 12 l./h. of residual water to be treated having a COD equal to 900 mg. $O_2$/l. Average contact time of water with sludge was 1 hour.

Content in dry materials ____ 0.65–2.0 g./l.
Ash rate _____ 9–12.5%.
Mohlmann index _____ 85.
Purified water COD _____ 490–620 mg. $O_2$/l., (30–45% purification).
Quantity of oxygen used ____ 1.15–1.7 kg./kg. of removed COD.

Thus, there is provided by the instant invention a process for creating a plural phase distribution of gas and suspension containing microorganisms wherein the rate of biological gas consumption corresponds to the rate of gas injection thereby significantly improving the efficiency of biological aeration systems.

While the invention has been described and pointed out with reference to certain preferred embodiments thereof, those skilled in the art will appreciate that various changes and modifications and substitutions can be made without departing from the spirit of the invention. It is intended, therefore, that the invention be limited only by the scope of the claims which follow.

What is claimed is:

1. In a process for treating a liquid suspension containing microorganisms comprising introducing said suspension into the upper portion of a treatment vessel wherein it descends therethrough, introducing a gas into the base of said vessel wherein said gas flows counter-currently against said suspension and reacts with said microorganisms, removing said suspension from the base of said vessel and recovering the reaction product of said gas and said microorganisms therefrom, and removing residual gas from the top of said vessel, the improvement comprising increasing the rate of reaction of said gas with said microorganisms relative to the amount of gas fed to said vessel, thereby increasing the efficiency of the process, by a process which comprises establishing at least three separate zones in said vessel which comprise an upper zone of a dense bed of said gas and said suspension, a lower zone containing less gas than said upper zone and an intermediate interface zone separating the upper and lower zones.

2. The process as defined by claim 1, wherein the suspension contains a surface-active agent.

3. The process as defined by claim 1, wherein the zones are maintained by withdrawing suspension from said vessel at a controlled rate.

4. The process as defined by claim 3, wherein the interface zone of said zones is maintained at a predetermined position in said vessel.

5. The process as defined by claim 4, wherein the interface zone is maintained in said position by continuously monitoring the pressure differential between a point in said vessel below the interface and a reference point within said interface zone and utilizing said pressure differential to control a valve which valve regulates the rate of suspension withdrawal.

6. The process as defined by claim 1, wherein the suspension is a water contaminated by undesirable microorganisms.

7. The process as defined by claim 1, wherein the gas is a biocidal gas.

8. The process as defined by claim 7, wherein the biocidal gas is selected from the group consisting of chlorine and ozone.

9. The process as defined by claim 1, wherein the gas is a gas necessary for sustaining the microorganism population in said suspension.

10. The process as defined by claim 9, wherein the gas is a gas which is necessary for microorganism metabolism.

11. The process as defined by claim 10, wherein the gas is selected from the group consisting of air, oxygen and carbon dioxide.

12. The process as defined by claim 1, wherein the suspension is further comprised of nutritive materials and materials to be transformed by the action of microorganisms thereon in bio-synthetic and bio-degradative methods.

13. The process as defined by claim 1, wherein the suspension is a residual water containing purifying microorganism.

14. The process as defined by claim 13 wherein the gas is selected from the group consisting of air and oxygen.

15. The process as defined in claim 1 wherein said suspension comprises water containing purifying microorganisms and wherein said gas comprises air or oxygen, the upper zone comprising water, sludges containing said microorganisms and said gas, said process further comprising the steps of separating the sludge from the purified water contained in the suspension withdrawn from the base of said vessel and recycling at least a portion of the separated sludge to said upper portion of said vessel.

16. The process as defined by claim 1 wherein the rate of gas flow upwardly through said vessel varies from 0.2 to 100 mm. per second.

17. The process as defined by claim 7 wherein the amount of gas in said upper zone exceeds 50% by volume, based on the volume of said upper zone, and wherein the amount of gas in said lower zone is less than 40% by volume, based on the volume of said lower zone.

References Cited

UNITED STATES PATENTS

| | | | |
|---|---|---|---|
| 3,479,281 | 11/1969 | Kikindai et al. | 210—44 |
| 3,374,052 | 3/1968 | Fan et al. | 210—20 X |
| 3,103,488 | 9/1963 | Griffin | 210—20 X |
| 3,264,213 | 8/1966 | Pav et al. | 210—7 X |

SAMIH N. ZAHARNA, Primary Examiner

B. CASTEL, Assistant Examiner

U.S. Cl. X.R.

210—62, 63, 195